March 3, 1970 D. WORTZMAN 3,499,124
FM RECORDING AND REPRODUCING ARRANGEMENT WITH SINGLE CARRIER AND PROPORTIONAL COMPENSATION
Filed Nov. 7, 1966 5 Sheets-Sheet 1

INVENTOR.
DONALD WORTZMAN
BY
John W Armbruster
ATTORNEY

March 3, 1970 D. WORTZMAN 3,499,124

FM RECORDING AND REPRODUCING ARRANGEMENT WITH SINGLE CARRIER AND PROPORTIONAL COMPENSATION

Filed Nov. 7, 1966 5 Sheets-Sheet 4

(27) $f_{s'}$ IS OF TWO PARTS, SIGNAL = $f_s$, WOW & FLUTTER = $Wf_s$,
$\ni f_{s'} = f_s + Wf_s$

(28) $f_t \neq f_o$ AND $f_t = f_o + Wf_o$
IF THERE IS NO WOW AND FLUTTER $f_t = f_o$ 3,499,124

FM RECORDING AND REPRODUCING ARRANGEMENT WITH SINGLE CARRIER AND PROPORTIONAL COMPENSATION

Donald Wortzman, Mahopac, N.Y., assignor to International Business Machines Corporation, Armonk, N.Y., a corporation of New York Filed Nov. 7, 1966, Ser. No. 592,395
Int. Cl. G11b *5/04*
U.S. Cl. 179—100.2 8 Claims

ABSTRACT OF THE DISCLOSURE

An arrangement is provided for correcting distortion in recording an information signal. A monitor tone signal is added to an information signal and the composite of the two signals is frequency modulated prior to recording. Upon reproduction, the composite signal is demodulated and the monitor tone signal is retrieved and demodulated to produce a correction signal indicative of the amount of distortion. The correction signal is proportioned in accordance with the deviation of the frequency modulated information signal from center frequency prior to being subtracted from the demodulated information signal.

This invention relates to improved means for compensating for noise or disturbance in the recording and transmission of data, and more particularly for means for correcting the output of magnetic recordings of physiological, seismological or other data gathering media so that when such magnetically stored media is stored and read, there is compensation provided for the shortcomings of the magnetic recording devices such as "wow and flutter" due to in part to speed variations of the recorder. Compensation is provided in the form of controls with an auxiliary frequency modulated tone which may be termed a monitor tone.

When a graph recording is being made on an electrocardiograph device for diagnosis of a heart condition, it is at times advisable to make a parallel magnetic tape recording of the electrical pulse beat output. Such a magnetic tape recording not only provides an alternate storage means for the heart condition recording, but it also provides a direct and readily available control for a central computer programmed to rapidly analyze and offer diagnosis of the kind of departure from the normal heart beat as indicated by the graph output of the recording. In order to make it possible that such magnetic recordings may be taken in a wide spread fashion and available in many locations without special expensive recorders it is proposed that ordinary recording devices such as dictation equipment as the "IBM EXECUTARY" device be used as a recorder. Economical forms of magnetic recording devices are subject to variations in tape speed due to external as well as internal variance of the power source and the result is a recording containing "wow and flutter" variations of true recordings which are ordinarily of no consequence in vocal recordings. However, should such disturbances be recorded as part of an electrocardiograph chart, they become puzzling to the physician, diagnostician or computer because there is ordinarily no way to sort out erroneous graph portions from the true graph picture of the heart condition. Abnormalities are determined on the basis of waveform, direction, amplitude and time interval of the graph wave pattern.

Heretofore there have been disclosed corrective controls associated with magnetic recording devices such as my application Ser. No. 477,120, filed on Aug. 4, 1965, now U.S. Patent 3,423,540, issued Jan. 21, 1969, for correction of distortion in recordings, but they are of a rather broad form resting on correction of major diversions from true conditions. Here, it is disclosed that additional improved provisions are made for complete compensation so that the most minute erroneous electrical disturbance due to wow, flutter, tape defects, dropouts, blank periods, etc. are either eliminated or made evident so that a diagnosis may rest on true, accurate and reliable premises.

An object of the invention is to provide a recording and reproducing means to provide correction of recordings by proportional compensation using constant tone control.

An object of the invention is to provide improved recording and reproducing devices employing a monitor tone superimposed on a signal in a frequency modulated storage and transmission system. A reproducer is provided with means to demodulate and filter the monitor tone to detect the noise component of the tone and subtract said noise component from the signal and thus provide a true signal recording.

Another object of the invention is to provide recording compensation in one channel or track of a recorder by superimposing a higher frequency monitor tone on a signal of lower frequency and modulating the combination with a still higher frequency when placed on recording media.

Another object of the invention is to provide improved electronic compensating means enabling the use of ordinary economical forms of magnetic tape recorders as storage, correction and transmission means for electrical recordings such as those produced by encephalographs, electrocardiographs, seismographs, and the like forms of devices.

Another object of the invention is to provide in data recording and transmitting devices a plurality of error correcting monitor tones for not only compensating for noise but also for identifying different types of data such as digital data as distinguished from analog data. When the tone is demodulated with the data signal, the difference in tone frequency provides distinguishable voltage levels and lengths of markings indicative of the type of data such as identifying names, dates and numbers which may thus be sent as an accompaniment with the charts of medical, geological, weather, or other data.

A still further object of the present invention is to provide proportional compensation for the recording and reproducing of frequency modulated signals on and derived from a magnetic tape. Note is taken here that the amount of distortion of an information signal is not simply proportional to the variations in tape speed alone, because the frequency of the information signal is also important. Hence, the present invention proposes to multiply the compensation signal from the control monitor by the ratio of the actual information signal frequency divided by the center carrier signal frequency before substrating it from the demodulated information signal.

Another object of the invention is to provide novel proportional compensational means for correcting "wow and flutter" errors in a magnetic recorder using a constant tone and frequency modulation of the composite output ready for transmission. Since wow and flutter is then not only proportional to changes in tape speed but also proportional to changes in signal carrier frequency, it is proposed there to go further in correction than the mere compensation by the use of tone control deviations and instead also proportion such compensation by subtracting the product of an offset signal voltage (which is dependent on carrier frequency) by a scale constant to effect perfect proportional compensation for noise. The relative constriction and expansion of signal and tone single shot voltage controls by momentary signal distortion and changes in carrier frequencies provides sensitive control levels which are fed back into a summer before appearing as a truly corrected recording and output to control an ECG device and/or to enter a diagnostic computer.

Another object of the invention is to so prepare data that it is in a form readily useable for control of a diagnostic computer. In order that the computer may properly recognize the chart variations representing true ECG characteristics, it is proposed to superimpose on such recording output signals, or alongside such signals, indications which are readily recognized as being associated with heart condition graphic illustrations rather than beng part of such llustrations, for example, the recording of digital identifying matter, erroneously occurring spikes denoting dropouts, breaks in the recording, and all dropout features of the recorded signals are to be made distinguishable so that the latter are not confused with the physiological data of the regular information phenomenon.

The foregoing and other objects, features and advantages of the invention will be apparent from the following more particular description of preferred embodiments of the invention, as illustrated in the accompanying drawings.

Although the invention is illustrated in connection with an electrocardiograph and a magnetic tape control, it is apparent that other forms of input data information may be similarly treated on other forms of recorders such as optical and electromechanical recorders and reproducers. An early form of recorder and reproducer control is presented in the IBM Technical Disclosure Bulletin, vol. 6, No. 12, May 1964, p. 29.

Figure 1:
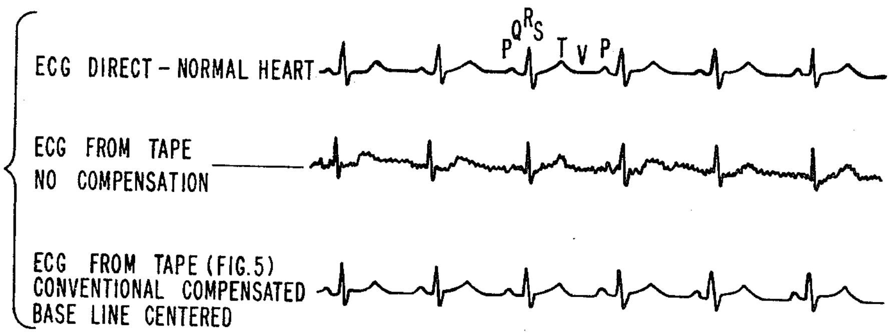
FIG. 1 shows a series of ECG recordings with and without compensation.
Figure 2:
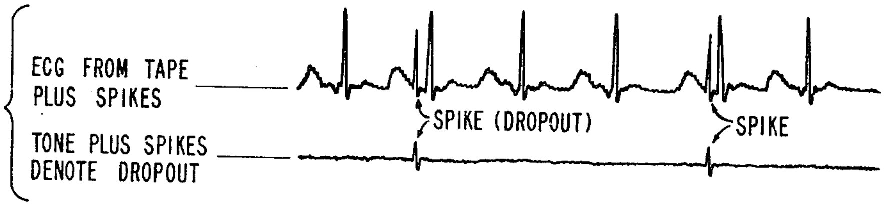
FIG. 2 shows a pair of chart recordings, one of which is an ECG recording with spike (dropouts) and the other is a graph illustration which shows a monitor tone also distinguishing the same spikes so they may be disregarded as part of a diagnosis.
Figure 3:
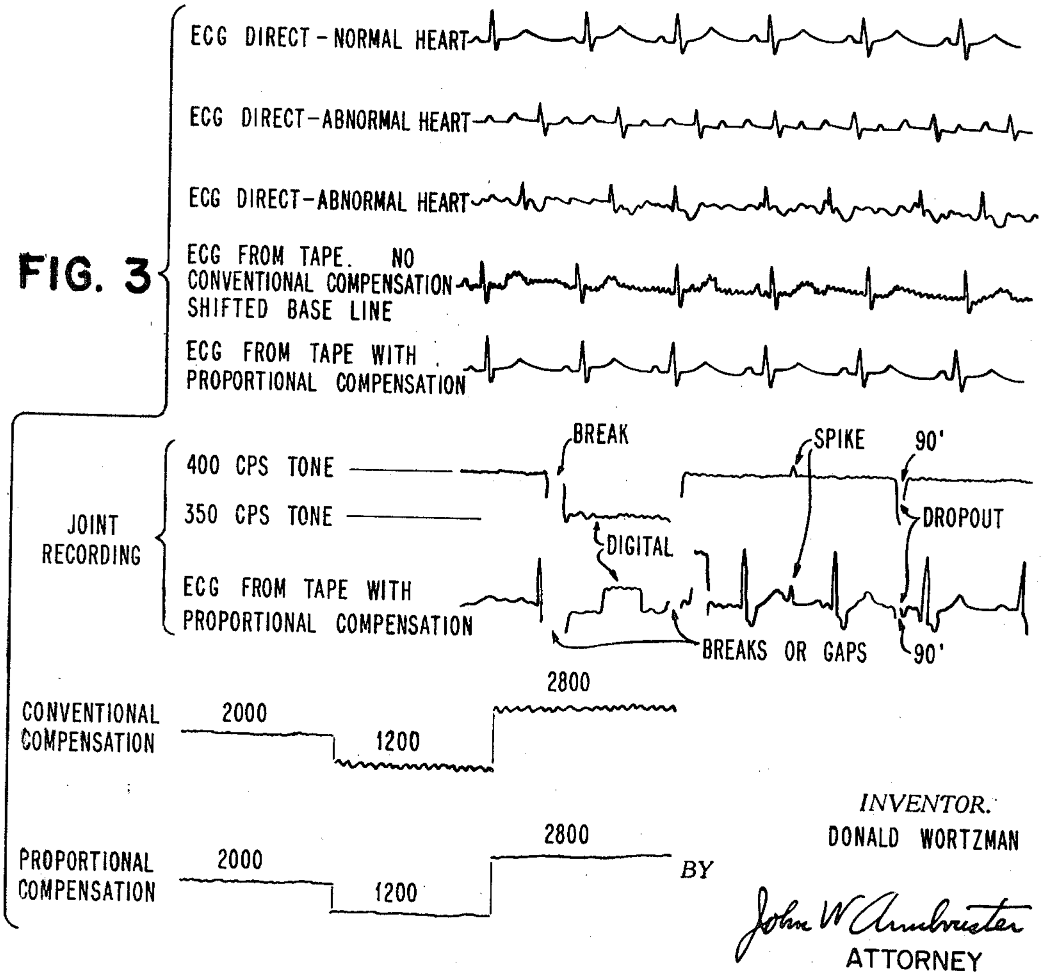
FIG. 3 shows a series of ECG normal and abnormal heart condition recordings and associated therewith recordings derived from magnetic tape recordings with and without proportional compensation.

Before presenting a brief summary of the description of the novel devices involved, it is believed well to note the usual direct and normal heart form of electrocardiogram as seen at the top of FIGS. 1 and 3. Since these graph lines are understood to be made directly by an electrocardiograph, it is pertinent to note that such an instrument is designed to record the electromotive force generated by the heart muscle preliminary to the physical contractions of the muscle. Most such ECG devices utilize radioamplification to influence the stylus type of recording which may be viewed instantly. The apparatus is in its essence a voltmeter and the graph recorded is a curve which continually alters with respect to time. In recording the graph the potential differences of two points on the surface of the body are measured. This is accomplished by placing electrodes on the extremities and on the chest.

A normal recording such as that shown at the top of FIG. 1 involves a normal sequence of PQRS and T waves. A small low voltage deflection P is caused by the atrial excitation. This is followed by a resting interval PR which denotes passage of electrical impulses from the atria to the ventricles. A tall rapid deflection signal signals a ventricle excitation QRS and the slow reflection thereafter, a ventrical recovery T; a small slow deflection V wave sometimes follows the T deflection. When the abnormal heart recordings shown in the second and third line of FIG. 3 are compared with some of the data derived from a tape without compensation such as the second line of FIG. 1 and the fourth line of FIG. 3, it is obvious that a great amount of confusion could be caused if the recordings are not relieved of error before reproduced for diagnostic control.

Figure 4:
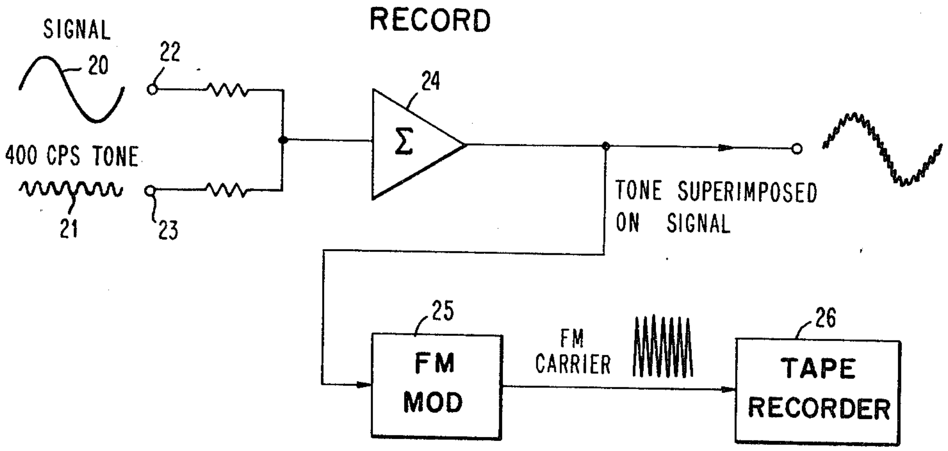
FIG. 4 is a block diagram showing a simple FM compensated recording system using a tone control and a single channel.
Figure 5:
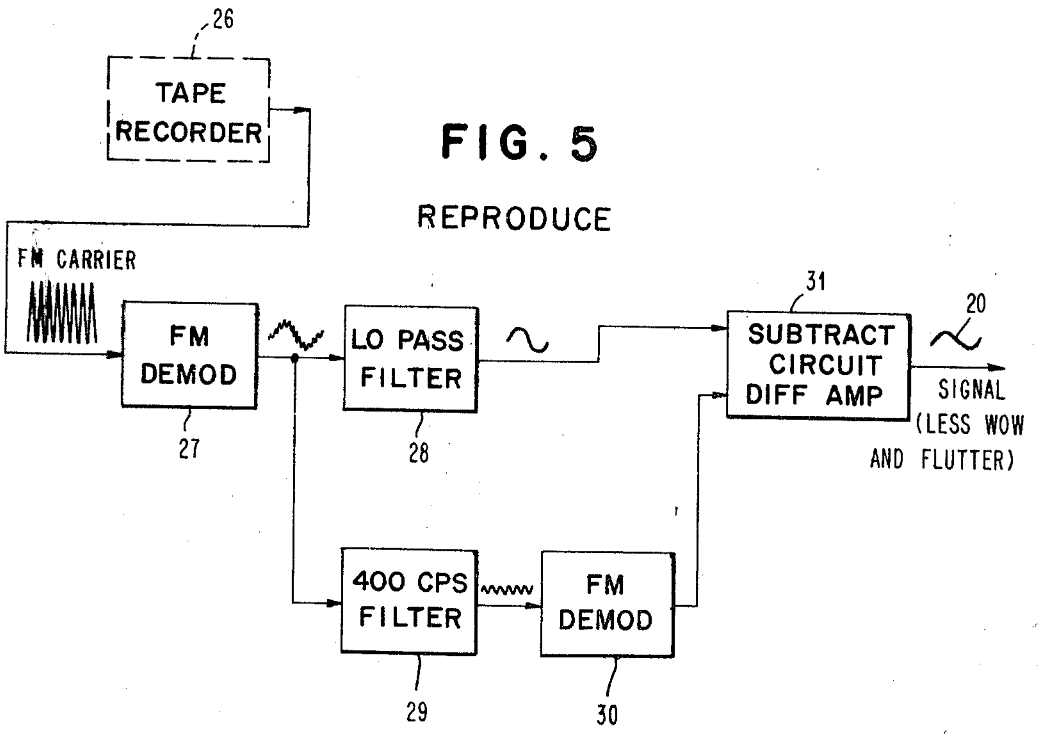
FIG. 5 is a block diagram of a playback or reproducing device for conrol by the recording of FIG. 4 and correction in the reproducing mode.

The general principles of operation for compensation may be noted by reference to the rather simple forms of recorder and reproducer shown in FIGS. 4 and 5, respectively. With reference to such figures, a sort of summary may be given which is of aid in understanding the more complicated form of controls found in the later views. In FIGS. 4 and 5 the FM controls are used in conjunction with a magnetic tape dictation recorder such as an IBM Executary recorder 26, such controls allowing the recording of low frequency information below 200 c.p.s. and also eliminate the first order effect of wow and flutter in the recorder. In FIG. 4 the incoming signals are shown at the left diagrammatically with the signal 20 representing a heart data signal in the present illustration. Below it is the monitored tone signal 21 which may be taken to be 400 c.p.s. These two signals are impressed upon the parallel input terminals 22 and 23 joined and connected to an amplifier 24. The incoming low frequency data plus monitored tone is frequency modulated in the device 25 and the resulting signal is fed to the Executary recorder 26 and recorded on the magnabelt therein. The FM controls may be taken to have a 2 kc. center frequency. The effect of wow and flutter in the recorder 26 is compensated for by recording the referenced or monitored tone signal of 400 c.p.s. in addition to the signal. In the recording mode these two signals are added, modulated by a 2000 c.p.s. carrier, and fed to a single recording head and recorded in a single channel or track on the magnabelt. It is possible to transmit and receive the data on the tape over telephone lines.

During playback and reproducing FIG. 5, the tape signal is fed to an FM demodulator 27 and the low frequency data is recovered. The data and tone signals are separated by filters 28 and 29, respectively, and the tone signal is further frequency demodulated by the device 30 so that there appears on the line out of the demodulator 30, normally such voltage as is created by the wow and flutter. The resulting low frequency signals representing data and noise are fed to the difference amplifier 31 in which the voltages due to wow and flutter are cancelled and the difference amplifier output is the true low frequency data originally considered in the form of the input data signal 20 shown in FIG. 4. During reproducing the FM carrier is demodulated to produce the signal with the 400 c.p.s. tone. By filtering, the tone is separated from the signal. Therefore, if the carrier frequency varies due to wow and flutter, the 400 c.p.s. tone will also vary by the same amount and so by demodulating the 400 c.p.s. tone and subtracting it from the signal the wow and flutter noise can be eliminated. The method of recording shown has several advantages in that there is no chance for intermodulation distortions because there is only one carrier and this enables the recorder to be nonlinear. The signal together with the tone may be transmitted over a regular telephone line and furthermore the loss of the FM carrier will insure loss of the tone so that it is obvious immediately if the signal is lost by the sharp variations in the tone frequency.

It will be noted that with reference to the recorder and reproducer shown in FIGS. 4 and 5, the recording here is limited to a single track. In the prior art recorders, a separate track is usually required for wow and flutter compensation. In order to do this there is used a frequency modulated zero voltage on the separate compensating track. Frequency modulation is accomplished by assigning to each frequency in a certain range a corresponding voltage such that a change in frequency is proportional to a change in voltage. In the prior art, on playback, since this separate compensating track has no signal on it, any signal that reproduces is just due to noise such as wow and flutter. Therefore, by subtracting such a signal from the signal on the separate information track, the noise due to wow and flutter is cancelled out. This results when the wow and flutter components on each track are the same, or for that part which is the same. The compensating FM signal is referred to here as the control tone or the monitor tone.

It is an oversimplification to state that the noise component is cancelled out completely by merely subtracting the tone differential from the signal differential. Since noise such as wow and flutter is not only proportional to change in tape speed, but is also proportional to the carrier frequency, when the carrier frequency is at a center frequency, such as 2 kc., the tone compensating signal might compensate exactly for noise. However, when the signal carrier is at a higher range, such as 2.8 kc., the noise would be 40 percent greater and therefore the compensatory signal would be too small to compensate for all the noise. Likewise when the carrier signal is at the lower range, such as at 1.2 kc., the tone compensatory signal will over compensate, thereby resulting in a noise signal of the opposite polarity. Therefore, ordinary tone control only compensates fully for the noise at the center frequency. It is the purpose here to provide compensation for noise over the full range of frequencies employed for the particular task. In the present illustration it is that of recording physiological data.

Figures 6, 7:
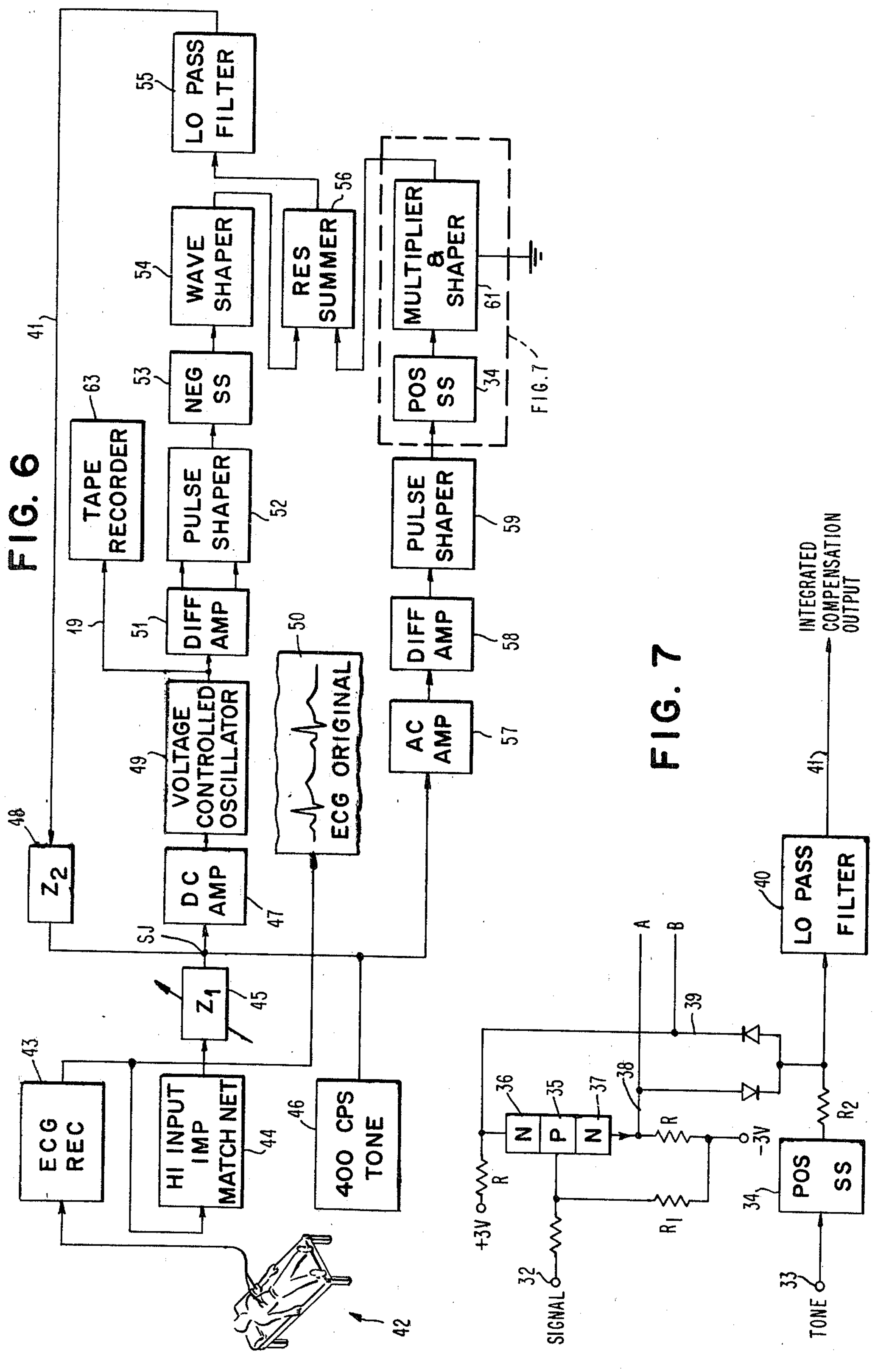
FIG. 6 is a diagrammatic showing of an ECG recording system including a magnetic tape device with proportional compensation devices.
FIG. 7 shows a transistorized noise proportional tone compensation multiplier circuit of the type used in the advanced form of recording and reproducing devices illustrated herein.
Figure 9:
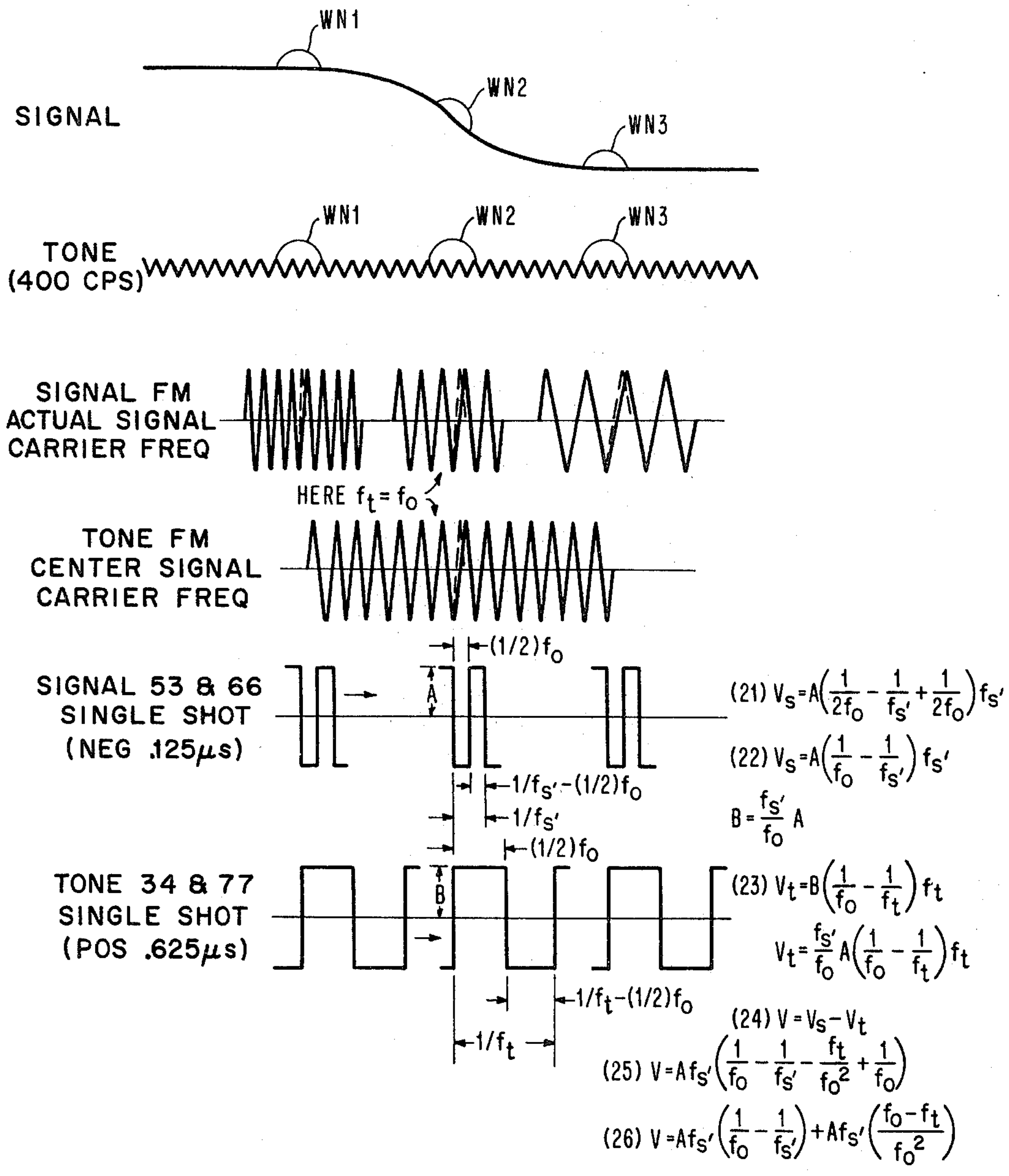
FIG. 9 is a diagrammatic chart showing graphically the signal and tone variations and the frequency modulated controls thereon and also the associated single shot controls for both signal and tone.

Referring to FIGS. 6 and 9 in general, it is seen that more complicated controls are provided in this modification to take care of noise occurring at all ranges of frequency modulation and thus provide proportional compensation of a more advanced and accurate form. The need for proportional control is evident when we assume 40 percent modulation and note a noise of one unit at the center carrier frequency. The noise at its +40 percent carrier frequency would then be 1.4 units and at its −40 percent carrier frequency, 0.6 units. By using tone compensation the resultant noise at the center carrier frequency would be 0 units, 0.4 units at the upper frequency and −0.4 units at the lower frequency. In other words plain tone compensation would improve the average noise signal by 5 to 1 and a peak to peak noise figure by 0.4 to 0.4 or 3.5 to one. This makes evident that a further improvement should be made and is made as noted here if the compensatory signal before being subtracted from the signal is first multiplied by the ratio of actual signal carrier frequency divided by its center signal carrier frequency. Then the resultant compensatory carrier frequency is not only proportional to variations in tape speed, but also proportional to variations in signal frequency. In the previous example of a higher frequency of 2.8 kc. as a signal carrier frequency, the compensatory signal would be at 2.8 divided by 2.0 times 1 unit, or 1.4 units. This is precisely equal to the noise of the signal and therefore when subtracted the resultant noise would be 0 units. At 1.2 kc. the result would be similar. In other words this procedure enables one to compensate in a proportional fashion and completely for the noise such as wow and flutter at all signal carrier frequencies.

Figure 8:
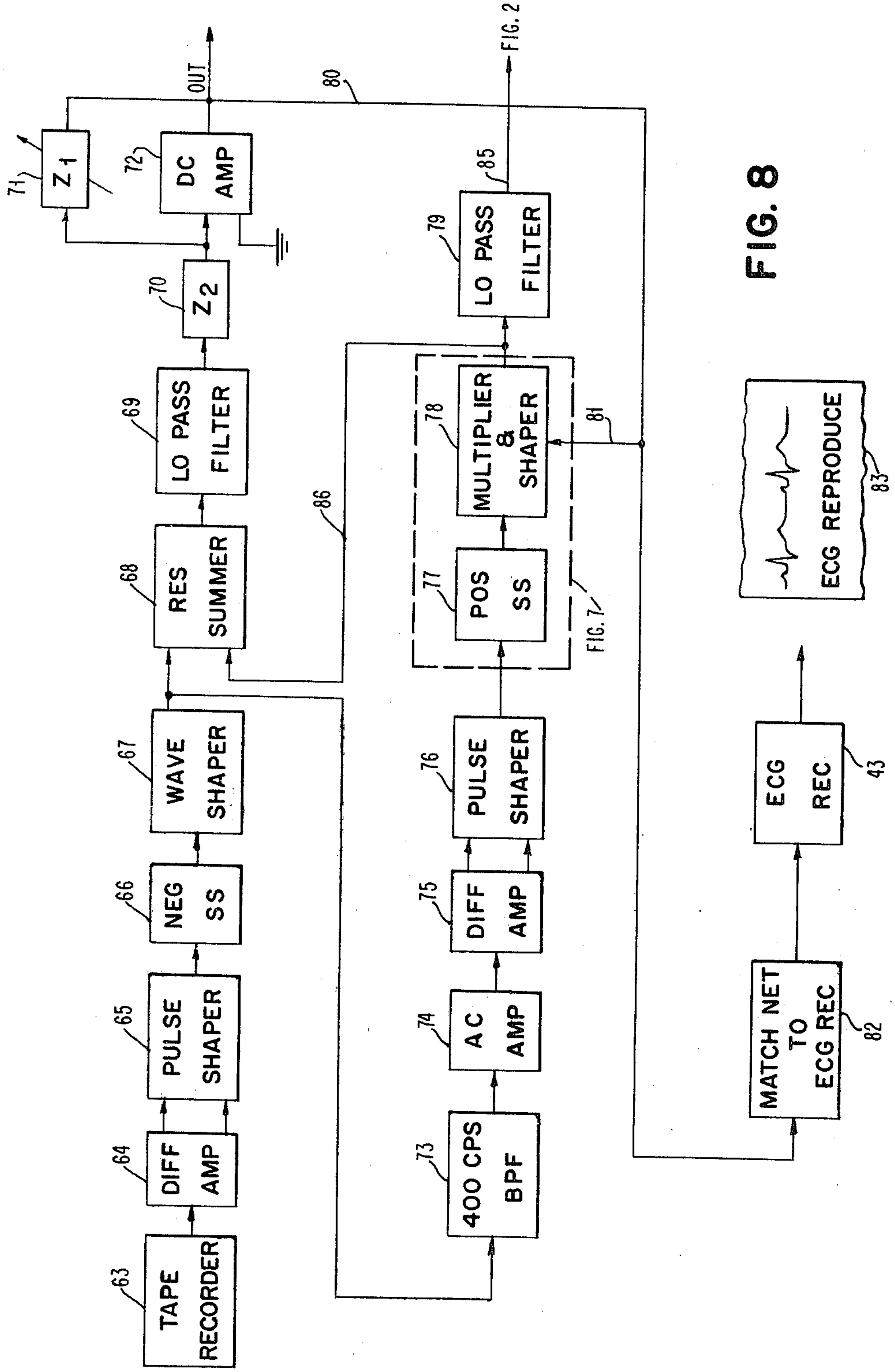
FIG. 8 is a diagrammatic showing of the playback or reproducing devices controlled by a tape recorder with proportional compensation employed to eliminate noise completely.

Before describing the complete record and reproduce circuits of FIGS. 6 and 8, it is believed well to first consider the critical multiplier or proportioning element of such circuits in the form of a transistorized control shown in FIG. 7. There it is seen that a NPN type transistor is connected to receive signal and tone variations in voltage, the latter beng directed through a single shot 34 which is affected as to its voltage output by the signal carrier frequency. Input terminals 32 and 33 respectively are to receive the signal and tone controls. The signal connection is to the base 35 while the tone output from the single shot is connected through a rectifier and along line 39 to the collector 36. The composite output through the emitter 37 is directed through a low pass filter 40 to provide an integrated compensated output at terminal 41.

Assuming that an output signal, +1 volt, corresponds to a carrier frequency of −33⅓ percent off the center frequency, then the following figures hold true. Assuming also with reference to FIG. 7, that the tone is at a nominal 2 kc. and that the single shot 34 fires once each cycle, then also the output levels of the single shot are ±V. Therefore, if the tone is 2 kc., then the output voltage will be 0 volts independent of signal amplitude. However, another instance may be given assuming that the tone varies by +1 percent and the signal is 0 volts corresponding to the 2 kc. center signal carrier, then point A, or line 38, will be at −1.5 volts; at point B, line 39, will be at +1.5 V. The output voltage will settle at $$\frac{1}{100}\times\frac{2\text{ kc.}\times 1.5\text{ v.}\times 0.5\text{ millisec.}}{1{,}000\text{ millisec.}}\text{ volts}$$

and this equals (0.015 volt). If the carrier frequency increases by 33⅓ percent to 2.667 kc., then the signal will be −1 volt; at point A, line 38, equal to −2 volts, and point B on line 39, equal +2 volts, and then the output would be $$V_{out}=\frac{1}{100}\times\frac{2\text{ kc.}\times 2\text{ v.}\times 0.5\text{ ms.}}{1{,}000\text{ ms.}}\text{ volts}$$

$$V_{out}=0.020\text{ volt}$$

Now remembering that if a compensation of one unit is necessary at a signal carrier frequency of the center at 2 kc., 1.33 units of compensation are necessary at 2.667 kc. Since the compensation was 0.015 volt at 2 kc., and 0.02 volt at 2.667 kc., follows that by calling 0.015 volt equal to 1 unit, $$0.02\text{ volt}=1\text{ unit}\times\frac{0.020}{0.015}=1.33\text{ units}$$

and exactly what is needed.

Therefore by subtracting the balanced or proportioned output from the signal, perfect compensation is attained, independent of the ranging of the signal carrier, and may be referred to as proportional compensation. This accurate noise compensating technique is independent of the particular kind of multiplier and also independent of the method for storing the tone which may be on a separate channel or track rather than combined as presented here for purposes of illustration.

In the prior art, noise compensation is performed without the balancing or proportioning or the multiplication steps of the present method. In the case of drawing ECG charts, it is evident that the omission of proper correction, results in subtracting too large a correction factor when the ECG is near one edge of the chart and not enough at the other edge, and this deficiency is more noticeable when the ECG has base line drift, or when it is deliberately off centered to accommodate large R or S waves.

Before proceeding more specifically to the solution, it is well to restate the problem as requiring the reproduction of an analog signal previously recorded on a magnetic tape and to do so with good fidelity. The term "good fidelity" implies several characteristics such as a linearity wherein the change in the reproduced signal is a fixed constant times the changed recorded signal. Then also there is DC stability wherein for at least one particular recorded voltage, the reproduced voltage is invariant to time of recording and time of reproduction (usually 0 volt in, produces 0 volt out). Then there is also the low noise characteristic wherein the fluctuation in reproduced voltage with no corresponding fluctuation in recorded voltage is held to a minimum. The characteristic of wide band width implies that the range of signal frequency for which the attenuation is small, should be large.

In addition to the requirement of good fidelity, the device is to have good electrical characteristics, be compact, portable and of low cost, and have the ability to have the recorded signal transmitted over telephone lines.

The type of modulation selected for use here, frequency modulation, depends solely on the ability of the recorder to record frequencies faithfully and therefore will compensate for rather gross nonlinearities in the tape system, but this improved linearity is traded for band width. As noted diagrammatically in the first four lines of the graphs on FIG. 9, frequency modulation is accomplished by assigning to each frequency in a certain range a corresponding voltage such that the change in frequency is proportioned to change in voltage. Here, there is assigned to 0 volts the frequency 2 kc. and a further assignment of the positive full scale voltage to 2.8 kc. and the equal and opposite negative minimum to 1.2 kc. and to each frequency inbetween the corresponding linearity interpellated value. The center frequency was selected as high as the limitations of an inexpensive tape recorder would permit in order that the modulator band width be as high as possible. The percentage of modulation was selected to be large in order to limit the effect of noise due to fluctuation in tape speed. For example, if the fluctuation of tape speed is assumed to be 1 percent, then at 2 kc. this would correspond to a variation in frequency of 20 c.p.s. If the percent modulation is 40 percent or 800 c.p.s. then the signal to noise ratio would be 800 divided by 20 or 40 to 1. A larger percent modulation would increase the signal to noise ratio, however too large a modulation would decrease the lower FM frequency beyond which it could not record the required signal band width, for example 0 to 100 c.p.s.

The foregoing are not the only reasons for selecting the particular center frequency and percentage of modulation, but they indicate the most troublesome problem which is noise due to fluctuation in tape speed often referred to wow and flutter. Another significant characteristic of wow and flutter is that it is carrier frequency dependent. Assuming the signal is at 0 volt which corresponds to 2 kc. (see WN2 represented on the first two lines of FIG. 9), a 1 percent fluctuation would correspond to a 20 c.p.s. change in carrier frequency. However, at 2.8 kc. (see WN1 in FIG. 9) the same 1 percent speed change would correspond to a change of 28 c.p.s. and likewise at 1.2 kc. (see WN3 on FIG. 9) the change in carrier frequency would be only 12 c.p.s. Since the change in frequency is proportional to voltage, it follows that in addition to being proportioned to tape speed fluctuation, the wow and flutter noise is also proportional to carrier frequency. The way in which this proportioned error is compensated is made more evident hereinafter.

Another technique for combatting noise is by emphasizing during recording all the frequencies in which there is little signal and similarly de-emphasizing them by the same ratio during playback or reproduction. By so doing the recorded signal amplitude does not increase appreciably but the wow and flutter at any frequency decreases by the amount of deemphasis at that frequency.

The third method for improving the signal to noise ratio is noted hereinbefore as being accomplished by recording with the signal a constant tone. This is also illustrated diagrammatically in the first four lines of FIG. 9. Whenever the FM signal varies due to change in tape speed, the tone also varies by the same percentage change as noted by the disturbances or noise WH1, WH2, WH3. Since both carriers are demodulated by the same technique, the compensation signal due to tone change will have the same shape as the noise signal due to change in signal carrier frequency, whenever the latter is due to changes in tape speed. Thus, any signal due to fluctuation in tape speed will produce similar wave shapes at the outputs of the signal demodulator and the tone demodulator. As stated hereinbefore, a simplified way of stating the cure would be to say that the demodulated tone multiplied by an appropriate constant is substracted from the demodulated signal carrier and then the residue is pure signal less the wow and flutter noise.

There are two methods for superimposing the compensatory tone with the signal. One method is to record the tone superimposed on the FM carrier frequency, placing it at a frequency outside the signal carrier bandwidth. A second method is to superimpose a tone on the signal before modulation. The first method is referred to as "tone on carrier" and the second as "tone on signal." Each of these methods has its own advantages and disadvantages. Which method is better, depends very much on the characteristics of the tape recorder, and the intended usage.

The "tone on signal" method used here does not entail the major disadvantage of the "tone on carrier" method wherein the recorder must be linear in order that the two carriers do not interfere with each other. In an attempt to transmit a signal over phone lines with the "tone on carrier" method, it would require that the signal be detected and then remodulated without a tone before transmission. In the present "tone on signal" method since there is just one carrier, this restriction does not exist. Having the capability to utilize the same type of circuitry for record and reproduce can be used to advantage to improve the fidelity of the system as noted hereinafter.

A significant consideration to be taken into account when using tone compensation is the amplitude of tone to be used because it cuts into the useable signal amplitude and therefore tone amplitude should be kept as small as possible. On the other hand, any noise at the tone frequency will tend to distort the tone and consequently produce compensation not present in the signal thereby adding to the presented noise. Therefore a compromise has to be sought. Experimentation indicates that when the tone utilized about 20 percent of the useable amplitude, the results came out the best.

A particularly troublesome problem with tape recorders is dropouts such as the one identified by numeral 90 on third line from bottom graph of FIG. 3. In general these graph line breaks are caused by the read-write head not being in contact with the tape magnetic material for a short period of time. This may be caused by obstructions, bouncing of the head due to vibrations or the lack of magnetic material at certain points, etc. Whenever a dropout occurs, the FM signal also disappears. This manifests itself as a signal similar to a sudden drop of FM frequency. Ordinarily it is difficult to detect the distinction of a dropout since it is hard to distinguish between the signal carrier decreasing in frequency and the signal FM carrier disappearing for a short time. The compensating tone can help in making this distinction as noted by the portion of the tone signal identified by numeral 90' which is coextensive with the break 90 as represented in the lower portion of FIG. 3. The tone graph line normally varies very little from the center frequency. However since the tone is superimposed with the signal, whenever the signal FM carrier disappears at 90, the tone also disappears as at 90'. Then each time the signal varies due to dropouts, the compensatory signal will vary more than just its normal few percent and this may also be used to locate a dropout. The changes in dual graph lines generate a marker to make the diagnostician aware, or the computer sense during reproduce that a dropout has occurred.

Attention may be now directed to a description of the FM units with respect to block diagrams shown in the drawings. FIGS. 6 and 8 are block diagrams of the record and reproduce circuitry, respectively, illustrating the "tone on signal" method of compensation. In these block diagrams $Z_1$ is the input impedance comprising parallel adjustable resistance and capacitance and $Z_2$ is the feedback impedance of resistance as noted in my other application Ser. No. 477,120.

Blocks 56 and 68 represent resistance summers with 56 used to add the negative of the demodulated tone to the signal which results in subtracting out the noise due to wow and flutter.

Each of the circuit networks includes a multiplier and shaper such as the multiplier and shapers 61 and 78 and they are similar in type to the transistorized circuit illustrated and described with reference to FIG. 7.

Considering first the upper row of the circuit blocks in FIG. 6, the operation of the recorder may be taken up first and traced as follows. When the input voltage to $Z_1$ 45 received from ECG recorder 43 through matching network 44, is zero volts, the output voltage of the DC amplifier 47 is such to maintain the voltage controlled oscillator 49 oscillating at 2 kc. The oscillating signal from 49, through connection 19, is recorded as an FM signal in recorder 63 and also triggers single shot 53. At each zero crossing of the 2 *kc.* carrier (once every 250 microseconds), the pulse shaper 52 outputs a negative going pulse which fires the 125 microsecond single shot 53. At this frequency, the single shot 53 is negative for as much time as it is positive. The wave shaper 52 clips the positive output of the single shot at $+V_c$ and similarly the negative voltage output at $-V_c$. At an oscillator frequency of 2 kc., the output voltage of the waveshaper is symmetrical. Therefore, the voltage at the output of the low pass filter 55 fed back to $Z_2$ 48 by 41 is zero volts. Neglecting leakage current at the input of the DC amplifier 47, the summing junction, S.J., is also at zero volts, since the voltages applied to $Z_1$ and $Z_2$ are both zero volts. The gain of the DC amplifier 47 is so large that when the summing junction varies minutely from zero volts, the output voltage of the DC amplifier 47 and the voltage controlled oscillator 49 vary through their entire range. By virtue of the feedback arrangement, the summing junction automatically assumes a voltage which maintains the voltage controlled oscillator 49 at 2 kc. For any other input voltage, there exists a frequency that produces a corresponding output voltage which maintains the summing junction at the proper level to maintain that frequency. Therefore, the ratio of the feedback voltage to the input voltage will be equal to the negative of the ratio of $Z_2$ to $Z_1$ or, in equation form:

$$\frac{V_{fs'}}{V_{in}}=-\frac{Z^2}{Z_1} \quad (1)$$

The change in frequency from the frequency at zero input volts ($f_o$) will be proportional to the input voltage. For example:

$$V_{fs'}=-\frac{V_c}{f_o}(f_{s'}-f_o) \quad (2)$$

Where $V_c$ is positive and negative clipping level (1.5 volts)

$f_o$ is center carrier frequency (2 kc.)

$f_{s'}$ is actual carrier frequency (including "wow and flutter" effects) i.e., $f_{s'}=f_s+Wf_s$ Now, by Equations 1 and 2

$$V_{in}=\frac{Z_1}{Z_2}\frac{V_c}{f_o}(f_{s'}-f_o) \quad (3)$$

or $$V_{in}\sim(f_{s'}-f_o) \quad (4)$$

Examining the lower row of circuitry in FIG. 6, in addition to the input signal, a 400 c.p.s. tone is also superimposed by emitter 46 on the input. The 400 c.p.s. tone is demodulated in a manner similar to the signal. However, in this case a positive single shot 34 of 0.625 $\mu$sec. is used (sixth line, FIG. 9). Therefore, the output signal of the multiplier and shaper 61, FIG. 6, is positive and negative for an equal amount of time. Its average output is zero volts and, therefore, does not affect the output of the low pass filter 55 into the summing junction. However, at worst, if the multiplier and shaper output is not symmetrical, its output produces a DC shift.

On reproduce, FIG. 8, the voltage controlled oscillator 49 of FIG. 6 is replaced by the tape recorder 63 in a playback mode. Therefore, provided the speed of the tape recorder does not vary between record and playback, and since the output of the tape recorder 63 is ordinarily passing through the same circuit components as it did during recording, the voltage at the input of $Z_2$ is the same as it was during recording. Also, since the gain of the DC amplifier is large, $$\frac{V_{out}}{V_{fs'}}=\frac{Z_1}{-Z_2} \quad (5)$$

Thus, by combining Equations 1 and 5, $$V_{out}=V_{in} \quad (6)$$

In other words, independent of any nonlinearities in any of the circuit building blocks, the output voltage is equal to the recorded voltage, provided the characteristics of none of the element or the supply voltages change between record and playback.

During recording, FIG. 6, the 400 c.p.s. oscillator control of 46 is superimposed on the input signal. During playback, FIG. 8, the recorded waves contain a 400 c.p.s. signal as represented by block 73, and this sensed component is used instead of the 400 c.p.c. oscillator to drive the AC amplifier 74.

It was shown previously that the input voltage during recording was proportional to $f_{s'}-f_o$, or $$V_{in}=+\frac{Z_1}{Z_2}\frac{V_c}{f_o}(f_{s'}-f_o) \quad (7)$$

Since $V_{out}$ equals $V_{in}$, then also $$V_{out}=+\frac{Z_1}{Z_2}\frac{V_c}{f_o}(f_{s'}-f_o) \quad (8)$$

If we consider the output volage due to the 400 c.p.s. tone path, it is similarly also described by $$V_{\underset{(\text{Tone})}{t\text{-}out}}=-\frac{Z_1}{Z_2}\frac{V_{tc}}{f_{to}}(f_t-f_{to}) \quad (9)$$

where $V_{tc}$ is the tone clipping voltage similar to $V_c$ $f_{to}$=is center tone frequency (400 c.p.s.)

$f_t$=is actual tone frequency

The prefacing sign is negative since the single shot 77 of the tone channel is positive instead of negative as it is in the signal path. During the time when the tone is 400 c.p.s., $f_t-f_{to}$ equals zero. Therefore, $V_{out}$ due to the tone is also zero. However, if the tone frequency should change for some reason, $V_{tout}$ would change proportionally. If Equations 8 and 9 are added, then the total output signal, as produced by Res. Summer 68, is represented by $$V_{out}=\frac{Z_1}{Z_2}\frac{V_c}{f_o}(f_{s'}-f_o)-\frac{Z_1}{Z_2}\frac{V_{to}}{f_{to}}(f_t-f_{to}) \quad (10)$$

Now assume:

$$V_{tc}=\frac{f_{s'}}{f_o}V_c$$

(Note that the multiplying function of the multiplier and shaper, also shown in FIG. 7 guarantee this.) Then, $$V_{out}=\frac{Z_1}{Z_2}\frac{V_c}{f_o}(f-f_o)-\frac{f}{f_{to}}(f_t-f_{to}) \qquad (11)$$

Ideally, $f_t=f_{to}$, however a "wow and flutter" speed fluctuation of $W\%\times 100$ then would result in $f_t=f_{to}+Wf_{to}$ and $f_{s'}=f_s+Wf_s$ where $f_s$ is the frequency component due to real signal and $W=W/100$.

Substituting in (11)

$$V_{out}=\frac{Z_1}{Z_2}\frac{V_c}{f_o}(f_s+Wf_s-f_o)-\frac{f_{s'}}{f_{to}}(f_{to}+Wf_{to}-f_{to}) \qquad (12)$$

Simplifying $$V_{out}=\frac{Z_1}{Z_2}\frac{V_c}{f_o}[f_s+Wf_s-f_o-(f_s+Wf_s)W] \qquad (13)$$

$$V_{out}=\frac{Z_1}{Z_2}\frac{V_c}{f_o}(f_s-f_o-W^2f_s) \qquad (14)$$

From Equation 14, it is seen that the "wow and flutter" error is proportional to $W^2$ and therefore, since W, in even the poorest of tape transports, is only a few hundredths, the error due to "wow and flutter" is less than one thousandths of the full scale signal. It should be noticed that in the circuit schematics shown, $V_{tc}$ is derived after compensation and, therefore, is equal to $$\frac{f_s}{f_o}V_c$$

Consequently, Equation 11 should read $$V_{out}=\frac{Z_1}{Z_2}\frac{V_c}{f_o}(f_{s'}-f_o)-\frac{f_s}{f_{to}}(f_t-f_{to}) \qquad (15)$$

which would simplify to $$V_{out}=\frac{Z_1}{Z_2}\frac{V_c}{f_o}(f_s-f_o) \qquad (16)$$

The latter equation has no error due to "wow and flutter." This further improvement is only of academic interest, since in either case the theoretical error is much below what is achieved in practice. If tone compensation but not proportional tone compensation was used, $V_{tc}$ would be a constant, equal to $V_c$. The Equation 10 would have resulted in, $$V_{out}=\frac{Z_1}{Z_2}\frac{V_c}{f_o}(f_s-f_o)+W(f_s-f_o) \qquad (17)$$

From this equation it follows that when $f_s\approx f_o$, the error signal due to "wow and flutter" is approximately zero; however, at all other signal carrier frequencies, the "wow and flutter" component has proportionately larger values. In general, since the percent modulation in most systems rarely gets beyond 40%, Error due to "wow and flutter" $=W(f_s-f_o)\leq 0.4\,Wf_o$ (18)

If no tone compensation was used, then Equation 8 would result in $$V_{out}=\frac{Z_1}{Z_2}\frac{V_c}{f_o}(f_{s'}-f_o)+Wf_s \qquad (19)$$

Unlike Equation 17, the error due to "wow and flutter" at $f_s\approx f_o$ is not zero, but is equal to $Wf_o$.

In fact, assuming 40% modulation

Error due to "wow and flutter" $=Wf_s\leq 1.4\,Wf_o$ (20)

It should be pointed out that since the output of the amplifier 72, FIG. 8, is used to obtain $V_{ct}$, when proportional tone compensation is used, $V_{tc}$ is distorted by the de-emphasis network. Therefore, the resultant improvement over nonproportional compensation is not dramatically large. However, if the higher signal frequency components are small, the error introduced has a negligible effect. Hence, if the de-emphasis network is placed after the closed loop, this problem could be alleviated.

Another set of computations may be offered here with reference to the circuit proportions shown near the bottom of FIG. 9.

$$V_{sig}=A\left(\frac{1}{2f_o}-\frac{1}{f_{s'}}+\frac{1}{2f_o}\right)f_{s'} \qquad (21)$$

$$V_{sig}=A\left(\frac{1}{f_o}-\frac{1}{f_{s'}}\right)f_{s'} \qquad (22)$$

$$V_{tone}=B=\frac{f_{s'}}{f_o}A\left(\frac{1}{f_o}-\frac{1}{f_t}\right)f_t \qquad (23)$$

$$V_t=\frac{f_{s'}}{f_o}A\left(\frac{1}{f_o}-\frac{1}{f_t}\right)f_t$$

$$V=V_s-V_t \qquad (24)$$

$$V=Af_{s'}\left(\frac{1}{f_o}-\frac{1}{f_{s'}}-\frac{f_t}{f^2_o}+\frac{1}{f_o}\right) \qquad (25)$$

$$V=Af_{s'}\left(\frac{1}{f_o}-\frac{1}{f_{s'}}\right)+Af_{s'}\left(\frac{f_o-f_t}{f^2_o}\right) \qquad (26)$$

Assume the tape recorder changes speed by W% then:

$f_{s'}$ is made up of two parts (27)
signal $f_s$
wow and flutter $wf_s$
$\therefore f_{s'}=f_s+wf_s$
$f_tf_o$ and $f_t=f_o+wf_o$ If there is no wow and flutter—$f_t=f_o$.

Case I—No compensation
by Equations 22 and 27

$$V_s=A\left(\frac{1}{f_o}-\frac{1}{f_s+wf_s}\right)(f_s+wf_s) \qquad (29)$$

$$V_s=A\left(\frac{f_s+wf_s}{f_o}-1\right) \qquad (30)$$

$$V_s=A\left(\left[\frac{f_s-f_o}{f_o}\right]+\left[w\frac{f_s}{f_o}\right]\right) \qquad (31)$$

Case II—Proportional compensation
by Equations 26, 27, and 28

$$V=A(f_s+wf_s)\left[\left(\frac{f_s+wf_s-f_o}{(f_s+wf_s)f_o}\right)\frac{-wf_o}{f_o^2}\right] \qquad (32)$$

$$V=A\left[\frac{f_s+wf_s-f_o}{f_o}\frac{-(f_s+wf_s)w}{f_o}\right] \qquad (33)$$

$$V=A\left[\frac{f_s-f_o}{f_o}-\frac{w^2f_s}{f_o}\right] \qquad (34)$$

Now assuming the wow and flutter is only a few percent for example, $x\%$:

Then the wow and flutter with compensation Eq. 34 is only $w\%$ of the wow and flutter without compensation Eq. 31. Consequently compensation improves wow and flutter about two orders of magnitude. Other noise problems usually prevent the compensation from ever improving the noise by more than one order of magnitude.

However, by using the compensation signal to obtain B then $$B=\frac{f_s}{f_o}A \text{ rather than } B=\frac{f_{s'}}{f_o}A$$

and then the noises with compensation would be decreased to zero for this application.

It is also of note that it is not essential to assume that the center frequency of the tone and the signal are the same, namely $f_o$.

Referring again to FIG. 8 it is seen that lines 80 and 81 act as a feedback to bring into the shaper 78 a signal B which is the demodulated $f_s$ and influences the output line 86 of the shaper to produce proportional compensation at the output of the summer 68. Feedback 81, from the DC amplifier 72 to multiplier and shaper 78 is used to obtain the proportional clipping level of the tone channel in order to effect proportional compensation and to provide an ECG reproduce signal to ECG recorder 43 through matching network 82. Feedback 81 of FIG. 8 corresponds to line 32 of FIG. 7. The output of pulse shaper 76, FIG. 8, corresponds to line 33 of the multiplier and shaper of FIG. 7. In FIG. 7, the voltage on line 41~V at 32 times $(f_t-f_{to})$.

The previous compensation techniques only compensated for voltage variation and not time variation. In other words, the resultant wave signal, if viewed on a scope, would look as if it was recorded with a sweep which fluctuated in speed. Fortunately, although the voltage errors due to time variation could be as large as errors due to frequency variation, for most applications the distortions in the former are less noticeable to the viewer. For example, when signals are recorded on strip chart recorders, the variation in paper speed causes time variation distortion, however, this effect is very rarely apparent. One reason why this type of distortion may not be troublesome is that the amount of distortion is proportional to the signal size, and, therefore, when viewing small signal fluctuations, the noise is very small; i.e., the signal to noise ratio is a constant, independent of signal size.

A second possible explanation is that the "wow and flutter" is proportional to speed fluctuation, and therefore, the time coordinate is proportional to the integral of speed. Integration tends to smooth out high frequency noise and consequently decrease the harmful effect.

Low frequency noise is accentuated by integration. In fact, if the DC level of the speed changes between record and reproduce, then, by comparing a long record, this difference becomes quite apparent. In some applications, such as ECG analysis, a few percent change in average speed would throw off some critical measurements, considerably. Therefore, an effort must be made to keep constant the DC components of record and reproduce speeds from machine to machine. If regulating the speed between machines becomes difficult, then the 400 c.p.s. tone could be used for this purpose. If each tape recorder has a well regulated 400 c.p.s. oscillator, as noted here, then any difference between the tape speed during record and playback would be proportional to change in tone frequency. This possibility for introducing automatic control is not performed in the record-reproduce system described here; however, the differences of frequency can easily be detected visually.

A method for compensating for the time fluctuation noise due to wow and flutter when going Analog to Digital (see line 6, FIG. 3) is to use the tone for determining the sample frequency. For example, if the tone is used as the clock for initiating and closing each sample, then the samples will be equally spaced referred back to the original recording. Assuming that the absence of a tone means that there is no data, then automatically no samples will be taken at those instances. By so doing, the digitized data will not be cluttered with unwanted noise.

While zero crossings of the tone mark off equal time intervals when recording, the amplitude of the demodulated tone channel marks off real time during reproduce.

Previously, it was shown that the reproduce signal is precisely the same as recorded signal independent of $Z_1$ and $Z_2$ provided they remain the same. This is even true if $Z_1$ or $Z_2$ have reactive components. By an appropriate choice of $Z_1$ and $Z_2$, some additional "wow and flutter" compensation could be obtained. For example, assume that the signal to be recorded has little power above some cutoff frequency. Then $Z_1$ and $Z_2$ could be chosen such that all components of the signal above this cutoff frequency are recorded at a higher amplitude. Since the amount of power above this frequency is small, the over-all percent increase in recording power will be small. Now, on playback, the reversing of $Z_1$ and $Z_2$ would have the effect of decreasing frequencies above the cutoff frequency by the same amount as it was increased during recording. Therefore, any noise introduced above this cutoff frequency, not present in the recorded signal, will be decreased during playback, whereas, any signal at these higher frequencies will reproduce distortionless. In those instances where the signal power is concentrated at a very low frequency, this method can decrease the higher frequency components of "wow and flutter" considerably. Also, carrier noise that may not be completely filtered out during reproduce, is also decreased considerably. This type of compensation has been recognized as preemphasis and deemphasis.

In addition to $Z_1$ and $Z_2$ being reactive, $Z_1$ and $Z_2$ could also be non linear such that small signals produce a proportionally larger change in frequency than large signals. This would improve the signal to noise ratio for small signals. Again, due to the reversing of $Z_1$ and $Z_2$, the reproduced output would not be distorted.

Another way to decrease the effect of "wow and flutter" is to utilize as much of the carrier frequency range as possible. This can be done easily, since by just varying the magnitude of the ratio of $Z_1$ to $Z_2$, the frequency shift is varied proportionally.

In any system where analog data is being stored on tape, a major problem is its identification. Identification falls into two categories, depending upon its intended use. If the identification is for another person, a very useful form is voice, since it is easily understood by everyone, and also easily coded by everyone. However, since recordings are used most frequently with a computer, it is also important to have a means of identification which is easily decoded by a computer; for example, a digital coding. To do this, the same mechanism used for recording analog information could also be used for coding. The most difficult problem, however is on the computer end—the decoding. Here it is difficult for the computer to decide which is analog information and which is digital information. One possibility is to make the sequence for digital information so unique that the computer can test for it, and never mistake it for analog information. However, this often increases the length of the program considerably, and puts an unnecessary burden on the digital computer and the programmer. A better method is to record simultaneously some easily decodable information which would identify automatically, for the computer whether the data is analog or digital. In the present case, 400 c.p.s. tone used for "wow and flutter" compensation is ideal for this purpose. Since the tone is 400 c.p.s. whenever there is analog information, it could be made 350 c.p.s. whenever there is digital information. 350 c.p.s. is chosen (line 6, FIG. 3) because it is close enough to 400 c.p.s. so that "wow and flutter" compensation will still be in effect, and also it is far enough away from 400 c.p.s. such that the difference in frequencies can be detected. As pointed out previously, the tone channel was set up so that the single shot duration was such that when the tone is detected, the output signal is zero volts at 2000 cycles. Therefore, at 350 c.p.s. the output voltage would be negative. Consequently, for analog information, the detected tone after filtering would be zero volts, and for digital it would be slightly negative and for any dropouts, it would be random. For short dropouts (40 ms.), this randomness manifests itself as a sharp spike. Thus, the tone plays a very significant role. It is recorded from line 85, FIG. 8, and tells whether the information is digital, analog, or non-existent (note the sixth and seventh lines, FIG. 3).

Any conventional digital coding technique consistent with the bandwidth limitations of the signal channel could be used. However, since the amount of digital coding for many analog base problems is limited to just a few characters, it is more important that the method used be simple and convenient rather than conserve bandwidth. Therefore, a useful method is to use different voltage levels to detect the different characters. However, if more than 10 characters are necessary, separation of the characters may be difficult and consequently, it may be advisable to use sets of two or more consecutive voltage levels to detect different characters.

Using different voltage levels to detect different characters has several advantages:

(1) It is simple to generate.

(2) It can be detected with an ADC normally used to encode the analog output of the tape recorder.

(3) It can be visually encoded from a strip chart recording.

(4) It can be heard, if played into a speaker, and with practice understood.

The bottom two lines of FIG. 3 show test recordings made while demodulating high, low and center frequency recordings with either conventional compensation or improved proportional compensation. It is evident that the ragged line of the ordinary compesation made reveals noise continues to influence the recording in a bad way. On the other hand, the smoothness of the final line with proportional compensation applied, shows that substantially all the noise influences are eliminated.

While the invention has been particularly shown and described with reference to preferred embodiments, it will be understood by those skilled in the art that various changes in form and detail may be made therein without departing from the spirit and scope of the invention.

What is claimed is:

1. Apparatus for correcting distoration of recorded information signals comprising:

means adding a monitor tone signal to an information signal to provide a composite monitor tone-on-information signal;

means coupled to said means adding for modulating said composite signal before recording;

means for reproducing said recorded composite signal;

means for demodulating the reproduced composite signal of said means for reproducing to provide a demodulated signal including said information signal and said monitor tone signal;

means for recovering said monitor tone signal from the said demodulated signal of said means for demodulating;

means for determining the distoration in said monitor tone signal from said means for recovering and producing a signal indicative of distoration in accordance therewith; and, correction means including means for combining said signal indicative of distortion with said demodulated information signal to provide correction to said information signal in accordance with the amount of distortion.

2. An apparatus according to claim 1 and including graphic recording means comprising:

means for producing an information graph recorded from said information signals, and output means responsive to said means for determining the distoration in said monitor tone signal for producing a monitor graph recorded from said tone signals, said monitor graph identifying positions in said information graph of breaks and dropouts as distinguished from information signals.

3. The apparatus in accordance with claim 1 wherein said distortion is a function of the frequency of the carrier of said modulated composite signal and wherein said means for determining the distortion includes means or proportioning said correction signal in accordance with variations in the frequency of said carrier.

4. The apparatus in accordance wtih claim 3 wherein said means for proportioning said correction signal in accordance with variations in the frequency of said carrier is controlled in response to the output signal from said means for combining whereby variations in the amplitude of said output signal are indicative of said variations in the frequency of said carrier.

5. The apparatus in accordance with claim 4 wherein said means for proportioning said correction signal includes voltage variable clipping means for clipping the amplitude of said signal indicative of distortion in accordance wtih said variations in the amplitude of said output signal.

6. An apparatus for correcting the noise distortion of an information signal recorded in a recording device comprising:

means superimposing a monitor tone signal on said information signal to provide a composite signal;

means coupled to said means for superimposing for frequency modulating said composite signal, the frequency band of the modulated signal being selected so as to exclude the frequency of said monitor tone signal;

means to record and reproduce said modulated signal;

demodulating means coupled to said means to record and reproduce for demodulating a recorded frequency modulated composite signal;

means for recovering said monitor tone signal from the demodulated signal of said demodulating means;

means for demodulating said monitor tone signal recovered by said means for recovering to provide a signal indicative of the amount of distortion introduced during recording;

variable clipping means having input means, output means and control means with said input means coupled to said means for demodulating said monitor tone signal to receive said signal indicative of the amount of distortion; and means including summing means for providing a distortion corrected output which is the sum of first and second inputs, said first input coupled to said demodulating means for receiving said information signal, said second input coupled to receive the output signal from the output means of said variable clipping means, said distortion corrected output coupled to said control means of said variable clipping means whereby the clipping level of said variable clipping means varies as a function of the amplitude of said distortion corrected output.

7. The apparatus as set forth in claim 6 wherein said means including summing means provides a control signal to the control means of said variable clipping means which is proportional to the ratio of the frequency of the information modulated carrier divided by the center frequency of said carrier.

8. A distortion correction apparatus for correcting distortion incident to recording an information signal comprising:

tone signal means having a predetermined frequency;

means for superimposing said tone signal on said information signal to provide a composite signal;

means for frequency modulating said composite signal to provide an FM composite signal;

means including means for recording and means for reproducing said FM composite signal;

first demodulating means coupled to said means for reproducing, said first demodulator means including pulse shaping means and trigger circuit means for providing a demodulated output signal comprising a train of pulses having spaces therebetween varying in accordance with said composite signal;

filtering means for filtering said tone signal from said demodulated signal;

second demodulating means coupled to said filtering means for demodulating said tone signal, said second demodulating means including pulse shaping means and trigger circuit means for providing a demodulated output signal comprising a train of pulses having spaces therebetween which vary in accordance with the amount of said distortion;

variable clipping means having an input circuit for receiving said train of pulses from said second demodulator means and having an output circuit and a control circuit whereby the level of clipping in said clipping means varies in accordance with the magnitude of the signal on said control circuit;

summing means for summing the said demodulated output signal of each of said first and second demodulating means to provide a distortion corrected output information signal; and means coupling said distortion corrected output information signal to the said control circuit of said variable clipping means to vary the clipping level in accordance with the magnitude of said distortion corrected output signal.

References Cited

UNITED STATES PATENTS

| | | | |
|---|---|---|---|
| Re. 26,412 | 6/1968 | Dolby et al. | 179—100.2 |
| 2,450,352 | 9/1948 | Piety | 179—100.2 X |
| 2,668,283 | 2/1954 | Mullin | 179—100.2 X |
| 2,780,679 | 2/1957 | Vandivere | 179—100.2 X |
| 2,807,797 | 9/1957 | Shoemaker | 179—100.2 X |

BERNARD KONICK, Primary Examiner

ROBERT S. TUPPER, Assistant Examiner

U.S. Cl. X.R.

128—2.05